No. 620,702. Patented Mar. 7, 1899.
A. CUSTODIS.
INDICATOR.
(Application filed Feb. 19, 1898.)

(No Model.) 2 Sheets—Sheet 1.

Witnesses:
William Miller
William Schulz

Inventor:
Alphons Custodis
by his attorneys
Roeder & Briesen

THE NORRIS PETERS CO., PHOTO-LITHO., WASHINGTON, D. C.

No. 620,702. Patented Mar. 7, 1899.
A. CUSTODIS.
INDICATOR.
(Application filed Feb. 19, 1898.)
(No Model.) 2 Sheets—Sheet 2.

UNITED STATES PATENT OFFICE.

ALPHONS CUSTODIS, OF DUSSELDORF, GERMANY.

INDICATOR.

SPECIFICATION forming part of Letters Patent No. 620,702, dated March 7, 1899.

Application filed February 19, 1898. Serial No. 670,917. (No model.)

*To all whom it may concern:*

Be it known that I, ALPHONS CUSTODIS, a citizen of the German Empire, and a resident of Dusseldorf, Germany, have invented a certain new and useful Improved Indicator, of which the following is a specification.

This invention relates to an improved indicator.

Figure 1:
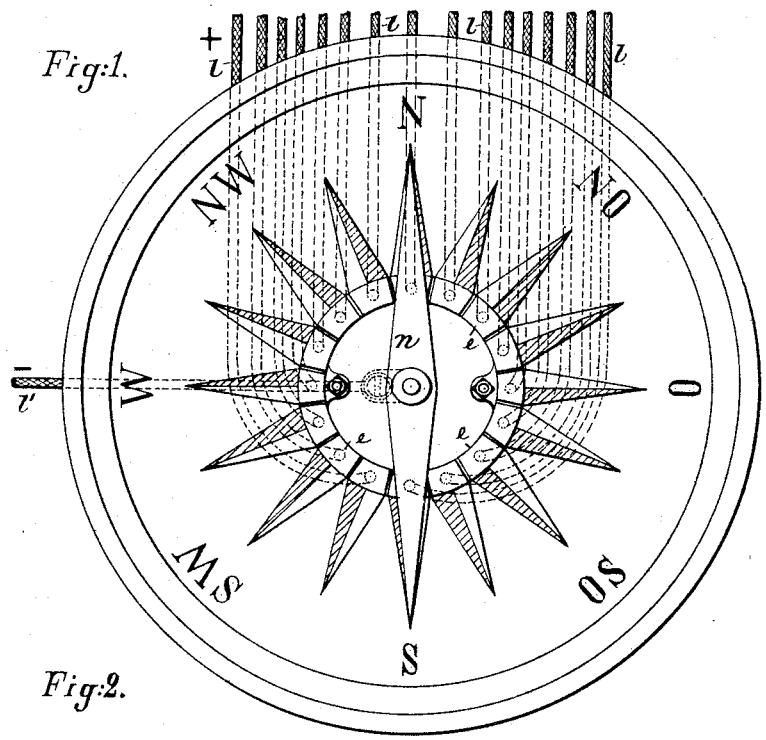
Figure 2:
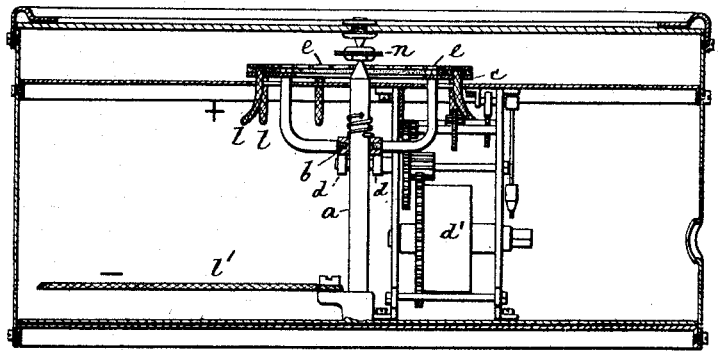
Figure 3:
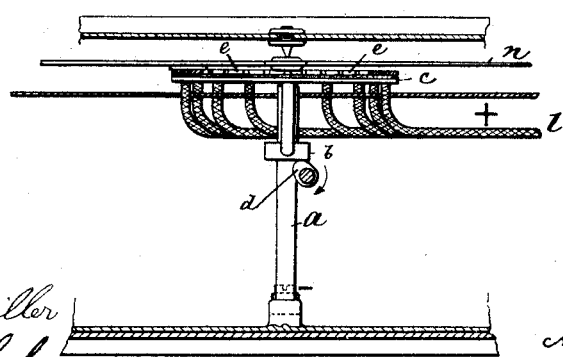
Figure 4:
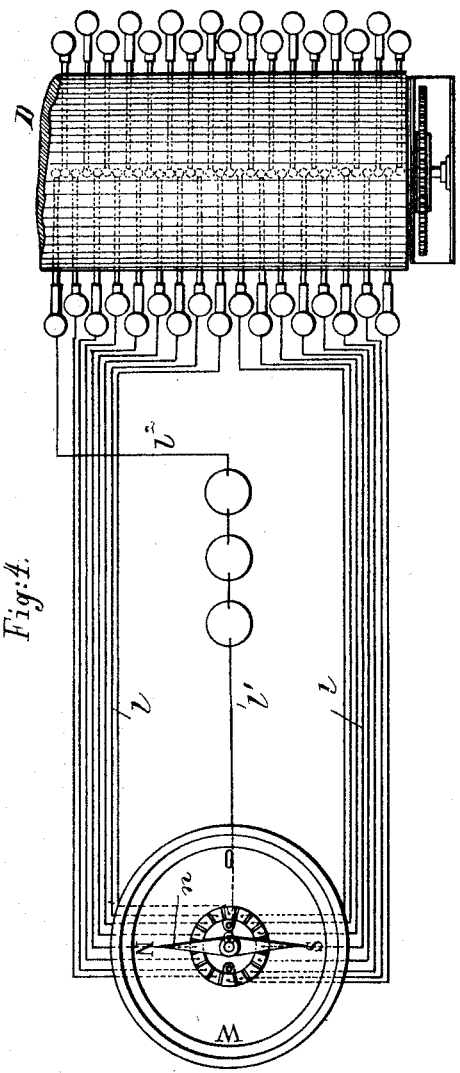

In the accompanying drawings, Figure 1 is a plan of a compass embodying my invention; Fig. 2, a vertical section through the same; Fig. 3, a detail of the lifting mechanism; and Fig. 4 is a plan of the indicator, showing it connected to a registering device.

The letter $n$ represents a magnetic needle, the shaft $a$ of which is connected to a galvanic battery or other source of electric energy by a conductor $l'$. Below the needle there are arranged a circle of insulated contacts or end pieces $e$, each one of which is provided with a separate conducting-wire $l$. The contacts $e$ are supported upon a common annular horizontal plate $c$, provided with a hub $b$, encircling shaft $a$. This hub is adapted to be engaged by one or more cams or tappets $d$, actuated by a clockwork or other means $d'$, so that the plate $c$, carrying the contacts $e$, is alternately raised and lowered. In this way the contact $e$ immediately below the needle $n$ is put into momentary metallic communication therewith or with a metal plate attached thereto to close the circuit. The current will travel from the battery through wire $l'$, shaft $a$, needle $n$, contact $e$, communicating therewith, and conductor $l$ to the electromagnet of an indicating or registering device D and back to the battery by a single return-wire $l^2$, Fig. 4. Thus the magnet will attract the pointer or registering-pencil to change its position and indicate or record the temporary position of the needle $n$. If the needle $n$ changes its position, it will contact with another of the pieces $e$ to close the circuit of another electromagnet and a second position will be recorded. In this way the instrument indicates or records accurately and at a distance the variations of the needle at stated intervals.

What I claim is—

An electric distance-indicator composed of a needle in circuit, a vertically-movable plate having a hub that surrounds the needle-shaft, insulated contacts supported upon the plate, a tappet adapted to alternately raise and lower the plate, a series of wires that separately connect the contacts with the electromagnets of a distant recording or indicating instrument, and a single return-wire, substantially as specified.

Signed by me at Dusseldorf, Germany, this 24th day of January, A. D. 1898.

ALPHONS CUSTODIS.

Witnesses:
WILLIAM ESSENWEIN,
JOB BECKER.